(12) United States Patent
Meijer et al.

(10) Patent No.: US 11,655,902 B2
(45) Date of Patent: May 23, 2023

(54) FAILSAFE CLOSE VALVE ASSEMBLY

(71) Applicant: OneSubsea IP UK Limited, London (GB)

(72) Inventors: John R. Meijer, Sugar Land, TX (US); Mangesh Edke, Sugar Land, TX (US)

(73) Assignee: OneSubsea IP UK Limited, London (GB)

(*) Notice: Subject to any disclaimer, the term of this patent is extended or adjusted under 35 U.S.C. 154(b) by 0 days.

(21) Appl. No.: 16/910,130

(22) Filed: Jun. 24, 2020

(65) Prior Publication Data

US 2020/0400240 A1 Dec. 24, 2020

Related U.S. Application Data

(60) Provisional application No. 62/865,412, filed on Jun. 24, 2019, provisional application No. 62/865,650, filed on Jun. 24, 2019.

(51) Int. Cl.
| | |
|---|---|
| *E21B 34/10* | (2006.01) |
| *F16K 5/06* | (2006.01) |
| *F16K 31/56* | (2006.01) |
| *F16K 31/122* | (2006.01) |

(52) U.S. Cl.
CPC ............ *F16K 5/0647* (2013.01); *E21B 34/10* (2013.01); *F16K 31/1221* (2013.01); *E21B 2200/04* (2020.05); *F16K 31/1225* (2013.01); *F16K 31/563* (2013.01)

(58) Field of Classification Search
CPC ............... F16K 5/0647; F16K 31/1225; F16K 31/563; F16K 31/1221; E21B 34/045; E21B 34/10; E21B 34/101; E21B 34/102; E21B 2200/04
See application file for complete search history.

(56) References Cited

U.S. PATENT DOCUMENTS

| | | | | | |
|---|---|---|---|---|---|
| 3,411,576 | A | * | 11/1968 | Taylor, Jr. ............... | E21B 43/01 166/363 |
| 3,457,991 | A | * | 7/1969 | Sizer ..................... | E21B 33/064 166/363 |
| 3,568,715 | A | * | 3/1971 | Taylor, Jr. ............... | E21B 43/01 137/613 |
| RE27,464 | E | * | 8/1972 | Taylor, Jr. ............. | E21B 34/045 166/363 |
| 3,724,501 | A | * | 4/1973 | Scott ...................... | E21B 17/01 166/321 |
| 4,306,623 | A | * | 12/1981 | Brooks .................. | E21B 34/045 166/322 |
| 4,320,804 | A | * | 3/1982 | Brooks ................. | E21B 34/045 166/339 |

(Continued)

*Primary Examiner* — Kevin F Murphy
*Assistant Examiner* — Jonathan J. Waddy
(74) *Attorney, Agent, or Firm* — Eileen Pape

(57) ABSTRACT

A valve assembly includes a ball configured to block fluid flow through the valve assembly while the ball is in a closed position and to enable fluid flow through the valve assembly while the ball is in an open position. The valve assembly also includes an actuator assembly configured to drive the ball to transition between the open position and the closed position. In addition, the valve assembly includes multiple compression springs disposed on one side of the ball. Each compression spring of the multiple compression springs is configured to directly urge the ball toward the closed position.

14 Claims, 6 Drawing Sheets

(56) References Cited

U.S. PATENT DOCUMENTS

| | | | | |
|---|---|---|---|---|
| 4,463,929 A | * | 8/1984 | Dantlgraber | F16K 17/04 251/44 |
| 4,467,867 A | * | 8/1984 | Baker | E21B 33/1294 166/188 |
| 4,467,870 A | * | 8/1984 | Langham | E21B 34/10 166/321 |
| 4,522,370 A | * | 6/1985 | Noack | E21B 34/045 251/63.5 |
| 4,529,035 A | * | 7/1985 | Bayh, III | E21B 43/12 166/212 |
| 4,535,968 A | * | 8/1985 | Gano | E21B 34/02 166/330 |
| 4,569,397 A | * | 2/1986 | Brakhage, Jr. | F16K 5/0647 166/321 |
| 4,619,320 A | * | 10/1986 | Adnyana | E21B 34/06 166/66.7 |
| 4,625,798 A | * | 12/1986 | Bayh, III | E21B 34/08 166/319 |
| 4,732,214 A | * | 3/1988 | Yates | E21B 34/045 166/336 |
| 5,094,426 A | * | 3/1992 | Zajac | F16K 31/1221 251/129.05 |
| 5,533,873 A | * | 7/1996 | Kindl | F04B 49/225 137/529 |
| 5,771,974 A | * | 6/1998 | Stewart | E21B 34/045 166/336 |
| 5,873,415 A | * | 2/1999 | Edwards | E21B 34/045 166/344 |
| 6,708,946 B1 | * | 3/2004 | Edwards | F16K 5/0689 251/58 |
| 9,309,979 B2 | * | 4/2016 | Russell | F16K 15/18 |
| 10,246,970 B2 | | 4/2019 | Deacon et al. | |
| 2010/0294508 A1 | * | 11/2010 | Xu | E21B 34/10 251/12 |
| 2011/0240299 A1 | * | 10/2011 | Vick, Jr. | E21B 34/10 166/321 |
| 2011/0266472 A1 | * | 11/2011 | Russell | E21B 21/106 251/28 |
| 2016/0138365 A1 | * | 5/2016 | Vick, Jr. | E21B 34/10 166/321 |
| 2017/0097103 A1 | * | 4/2017 | Taya | F16K 31/1225 |

* cited by examiner

FAILSAFE CLOSE VALVE ASSEMBLY

CROSS-REFERENCE TO RELATED APPLICATION

This application claims priority to and the benefit of U.S. Provisional Application No. 62/865,412, entitled "RETAINER VALVE WITH PLURAL FAILSAFE SPRINGS FOR USE IN SUBSEA LANDING STRING" filed Jun. 24, 2019, and of U.S. Provisional Application No. 62/865,650, entitled "FAILSAFE VALVE WITH COMPOSITE SPRING ARRANGEMENT" filed Jun. 24, 2019 which are hereby incorporated by reference in its entirety for all purposes.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. For example, in subsea operations, hydrocarbon fluids such as oil and natural gas are obtained from a subterranean geologic formation, referred to as a reservoir, by drilling a well that penetrates the hydrocarbon-bearing geologic formation. In various subsea applications and other well applications, hydraulically-actuated valve assemblies are used to control fluid flow through a well string. Hydraulically-actuated valve assemblies include one or more hydraulic actuators configured to drive a valve element (e.g., ball, etc.) of the valve assembly between an open position and a closed position. In certain applications, failsafe close valve assemblies are used to block fluid flow through the valve assembly in the event that hydraulic fluid flow to the valve actuator(s) is interrupted. Certain failsafe close valve assemblies include a closing device configured to drive the valve element to the closed position in response to interruption of hydraulic fluid flow to the valve actuator(s). Unfortunately, some closing devices do not have sufficient force to drive the valve element to the closed position under certain conditions.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
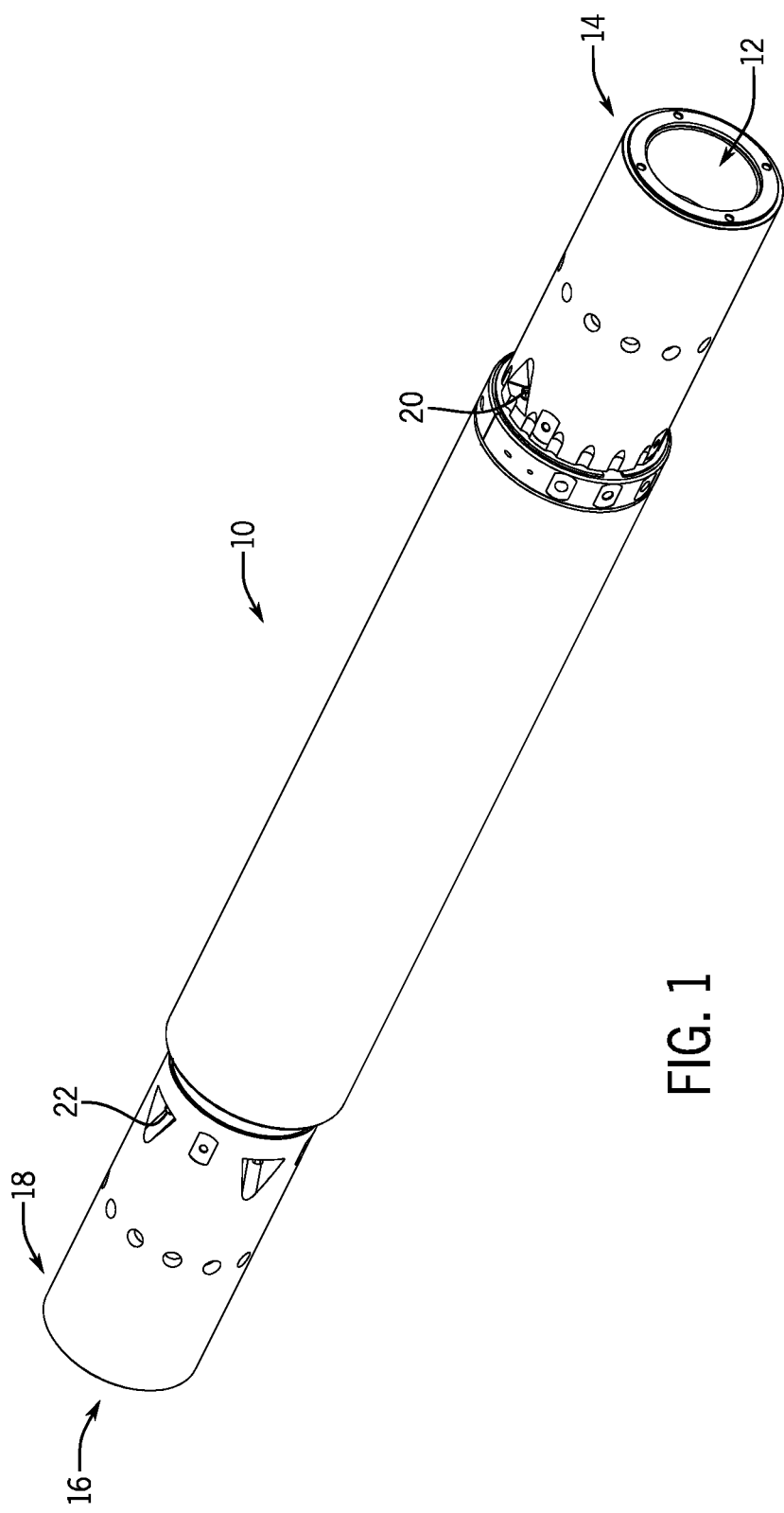
FIG. 1 is a perspective view of an embodiment of a valve assembly.

FIG. 1 is a perspective view of an embodiment of a valve assembly 10. In certain embodiments, the valve assembly 10 may be disposed along a well string, such as a landing string. For example, the valve assembly 10 may be used as a retainer valve within a subsea landing string. In the illustrated embodiment, the valve assembly 10 includes a first port 12 (e.g., to below-ball tubing) positioned at a first end portion 14 (e.g., downhole end portion) of the valve assembly 10, and the valve assembly 10 includes a second port 16 (e.g., to above-ball tubing) positioned at a second end portion 18 (e.g., uphole end portion) of the valve assembly 10. The first port 12 is configured to receive fluid (e.g., from a well), and the valve assembly 10 is configured to control flow of the fluid through the valve assembly 10 between the first port 12 and the second port 16.

As discussed in detail below, the valve assembly 10 includes a ball configured to block fluid flow through the valve assembly while the ball is in a closed position and to enable fluid flow through the valve assembly while the ball is in an open position. In addition, the valve assembly includes an actuator assembly configured to drive the ball to transition between the open position and the closed position. Furthermore, as discussed in detail below, the valve assembly 10 includes multiple compression springs disposed on one side of the ball, in which each compression spring of the multiple compression springs is configured to directly urge the ball toward the closed position. The compression springs provide sufficient force to the actuator assembly to cause the ball to transition to the closed position is response to an interruption in operation of the actuator assembly. In the illustrated embodiment, the actuator assembly includes two hydraulic pistons configured to drive the ball to transition between the open and closed positions. The valve assembly 10 also includes first hydraulic input(s) 20 and second hydraulic input(s) 22. Applying pressurized hydraulic fluid to the first hydraulic input(s) 20 causes a first hydraulic piston to drive the ball to the closed position, and applying pressurized hydraulic fluid to the second hydraulic input(s) 22 causes a second hydraulic piston to drive the ball to the open position. If hydraulic fluid flow to the second hydraulic input(s) 22 is interrupted, the compression springs drive the ball to the closed position. Accordingly, the illustrated valve assembly is considered a failsafe closed valve assembly.

Figure 2:
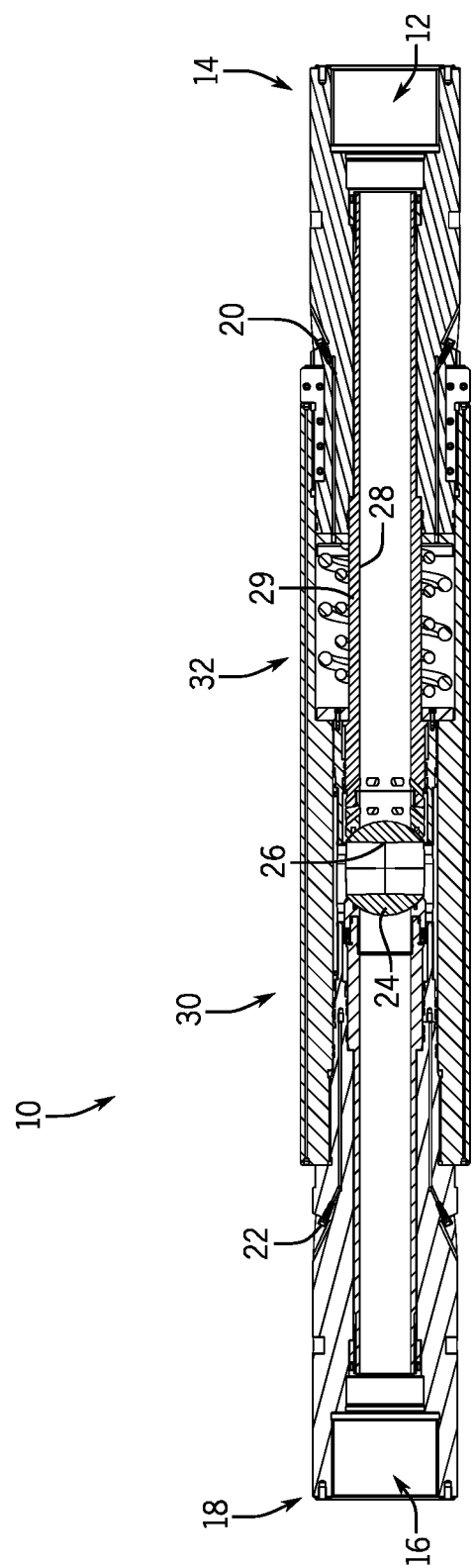
FIG. 2 is a cross-sectional view of the valve assembly of FIG. 1.

FIG. 2 is a cross-sectional view of the valve assembly 10 of FIG. 1. As previously discussed, the valve assembly 10 includes a first port 12 (e.g., to below-ball tubing) positioned at the first end portion 14 (e.g., downhole end portion) of the valve assembly 10, and the valve assembly 10 includes a second port 16 (e.g., to above-ball tubing) positioned at the second end portion 18 (e.g., uphole end portion) of the valve assembly 10. In addition, the valve assembly 10 includes a ball 24 configured to block fluid flow through the valve assembly 10 while the ball 24 is in the closed position and to enable fluid flow through the valve assembly 10 while the ball 24 is in the open position. In the illustrated embodiment, the ball 24 is configured to rotate between the illustrated closed position and an open position. While the ball is in the open position, a fluid pathway 26 (e.g., wellbore tubing fluid pathway) extending through the ball substantially aligns with a fluid passage 28 of a mandrel 29 of the valve assembly 10. Accordingly, with the ball in the open position, fluid (e.g., below-ball wellbore tubing fluid) enters the first port 12, flows through the fluid passage 28 of the valve assembly 10 and the fluid pathway 26 of the ball 24, and exits the second port 16 (e.g., to above-ball tubing). In the illustrated embodiment, the mandrel 29 includes internal above-ball tubing (e.g., above-ball tubing internal to the valve assembly) and internal below-ball tubing (e.g., below-ball tubing internal to the valve assembly). While the valve assembly includes a ball 24 in the illustrated embodiment, in other embodiments, the valve assembly may include another suitable type of valve element, such as a flapper of a flapper valve, among other suitable types of valve elements.

In the illustrated embodiment, the valve assembly 10 includes an actuator assembly 30 configured to drive the ball 24 between the open position and the closed position. In addition, the valve assembly 10 includes multiple compression springs 32 disposed on one side of the ball 24, in which each compression spring of the multiple compression springs is configured to directly urge the ball 24 toward the illustrated closed position. The compression springs 32 provide sufficient force to the actuator assembly 30 to cause the ball to transition to the closed position in response to an interruption in operation of the actuator assembly 30. Accordingly, the illustrated valve assembly 10 is configured a failsafe closed valve assembly. As used herein, "compression spring" refers to any device or combination of devices that apply a force in response to compression of the device(s), in which the force is applied in the opposite direction of the direction of compression. Furthermore, as used herein, "directly urge" refers to applying a force to urge the ball to transition to the closed position, in which the force does not pass through another compression spring of the multiple compression springs.

Figure 3:
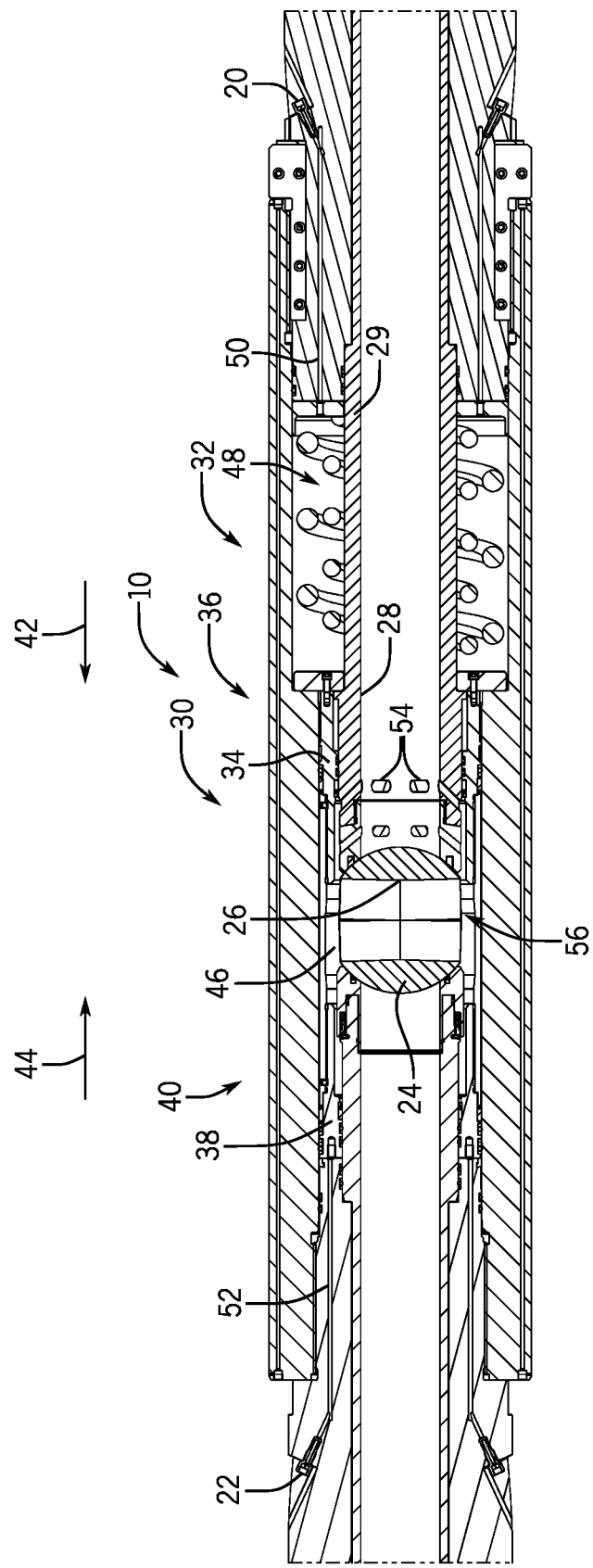
FIG. 3 is a cross-sectional view of a portion of the valve assembly of FIG. 1.

FIG. 3 is a cross-sectional view of a portion of the valve assembly 10 of FIG. 1. As previously discussed, the valve assembly 10 includes an actuator assembly 30 configured to drive the ball 24 between the open position and the closed position. In the illustrated embodiment, the actuator assembly 30 includes a first piston 34 positioned on a first side 36 of the ball 24 and a second piston 38 positioned on a second side 40 of the ball 24, opposite the first side 36. The first piston 34 is configured to move in a first direction 42 (e.g., uphole direction) to drive the ball 24 toward the illustrated closed position, and the second piston 38 is configured to move in a second direction 44 (e.g., downhole direction), opposite the first direction 42 (e.g., uphole direction), to drive the ball 24 toward the open position. In the illustrated embodiment, the actuator assembly 30 includes an operator 46, the first piston 34 and the second piston 38 are coupled to the operator 46, and the operator 46 is pivotally coupled to the ball 24. For example, the ball may include a slot, and a slider may be disposed within the slot. The slider may include a pin engaged with an aperture of the operator, which is positioned radially outward from the axis of rotation of the ball. Accordingly, as the operator is driven to move in the first direction 42 (e.g., uphole direction) and in the second direction 44 (e.g., downhole direction) by the pistons, the operator drives the slider to rotate, thereby driving the ball 24 to rotate toward the closed position and toward the open position, respectively.

To drive the ball 24 to the closed position, pressurized hydraulic fluid is supplied to the first hydraulic input(s) 20. The pressured hydraulic fluid flows from the first hydraulic input(s) 20 to a fluid chamber 48 via first hydraulic line(s) 50. The pressured hydraulic fluid within the fluid chamber 48 drives the first piston 34 to move in the first direction 42 (e.g., uphole direction), thereby driving the operator 46 to move in the first direction 42 (e.g., uphole direction). Movement of the operator 46 in the first direction 42 (e.g., uphole direction) drives the ball 24 to rotate toward the closed position via rotation of the slider. In addition, to drive the ball 24 to the open position, pressurized hydraulic fluid is supplied to the second hydraulic input(s) 22. The pressured hydraulic fluid pressurizes second hydraulic line(s) 52, thereby driving the second piston 38 to move in the second direction 44 (e.g., downhole direction). Movement of the second piston 38 in the second direction 44 (e.g., downhole direction) drives the operator 46 to move in the second direction 44 (e.g., downhole direction), thereby driving the ball 24 to rotate toward the open position via rotation of the slider.

In addition, in the illustrated embodiment, the valve assembly 10 includes pathway(s) 54 extending between the fluid passage 28 and a cavity 56 between the pistons. The pathway(s) 54 are configured to direct pressurized fluid within the fluid passage 28 on the first side 36 of the ball 24 to the cavity 56, thereby urging the first piston 34 to move in the second direction 44 (e.g., downhole direction), which urges the ball 24 toward the open position. As a result, while the fluid within the fluid passage 28 on the first side 36 of the ball 24 is pressurized, the ball 24 is urged toward the open position. Furthermore, in the illustrated embodiment, multiple compression springs 32 are disposed within the fluid chamber 48. Each compression spring of the multiple compression springs 32 is configured to directly urge the first piston 34 to move in the first direction 42 (e.g., uphole direction), thereby urging the ball 24 to transition toward the closed position. Accordingly, to transition the ball 24 to the open position, the second piston 38 provides a sufficient force to overcome the bias provided by the compression springs 32. In the illustrated embodiment, the compression springs 32 provide sufficient force to drive the ball 24 to the closed position in response to interruption in hydraulic fluid flow to the second hydraulic input(s) 22, even while pressurized fluid within the fluid passage 28 on the first side 36 of the ball 24 urges the ball toward the open position. Accordingly, the illustrated valve assembly is considered a failsafe closed valve assembly.

While the valve assembly includes the pathway(s) extending between the fluid passage 28 and the cavity 56 in the illustrated embodiment, in other embodiments, the pathway(s) may be omitted. Furthermore, while the first piston and the second piston are positioned on opposite sides of the ball in the illustrated embodiment, in other embodiments, the first and second pistons may be positioned on the same side of the ball. In addition, while the actuator assembly includes an operator in the illustrated embodiment, in other embodiments, the actuator assembly may have other suitable device(s) configured to translate the translational movement of the pistons into rotational movement of the ball. Furthermore, while the actuator assembly includes two pistons in the illustrated embodiment, in other embodiments, the actuator assembly may include more or fewer pistons (e.g., a single double-acting piston, multiple pistons configured to drive the ball to rotate in each direction, etc.). In addition, while the actuator assembly includes pistons in the illustrated embodiment, in other embodiments, the actuator assembly may include one or more other suitable types of actuators to drive the ball to transition between the open and closed positions (e.g., pneumatic actuator(s), hydraulic motor(s), electromechanical actuator(s), etc.).

Figure 4:
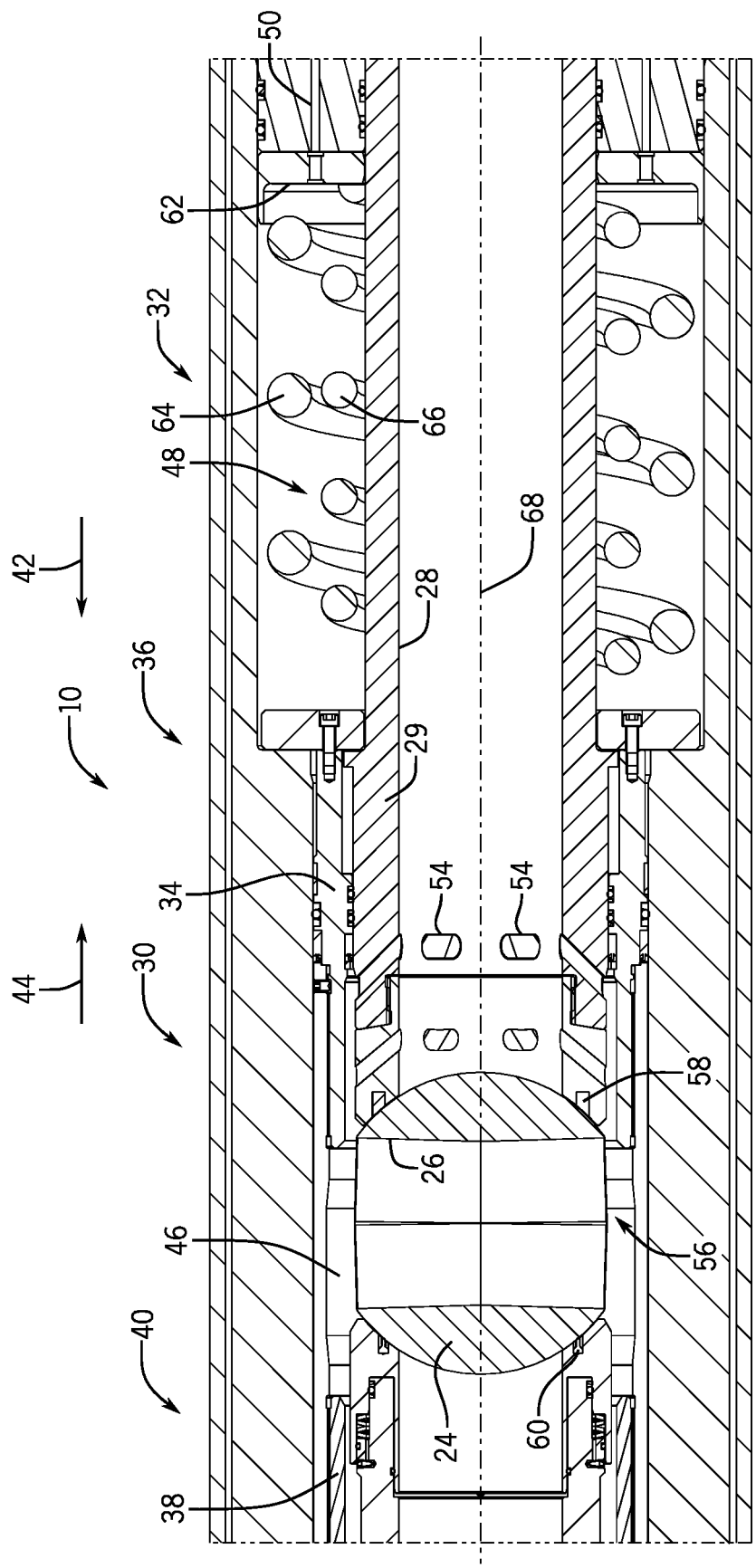
FIG. 4 is a detailed cross-sectional view of a portion of the valve assembly of FIG. 1.

FIG. 4 is a detailed cross-sectional view of a portion of the valve assembly 10 of FIG. 1. In the illustrated embodiment, the valve assembly 10 includes a bushing 58 (e.g., annular bushing) and a seal 60 (e.g., annular seal). The bushing 58 is positioned on the first side 36 of the ball 24, and the seal 60 is positioned on the second side 40 of the ball 24. While the ball 24 is in the illustrated closed position, the seal 60 is configured to contact the ball 24 to block fluid flow through the fluid passage 28. While the valve assembly includes a single seal in the illustrated embodiment, in other embodiments, the valve assembly may include more or fewer seals (e.g., 0, 1, 2, 3, 4, 5, 6, 7, 8, or more) of any suitable type(s).

In the illustrated embodiment, the multiple compression springs 32 are disposed within the fluid chamber 48 and extend between a base 62 of the fluid chamber 48 and the first piston 34. Accordingly, each compression spring of the multiple compression springs 32 directly urges the first piston 34 to move in the first direction 42 (e.g., uphole direction), thereby urging the ball 24 to transition to the closed position. In the illustrated embodiment, the compression springs 32 include a first compression spring 64 and a second compression spring 66. Each compression spring directly contacts the base 62 of the fluid chamber 48 and the first piston 34. However, in other embodiments, at least one compression spring may directly contact one or more intervening structures (e.g., sleeve(s), washer(s), support(s), etc.) disposed between the at least one compression spring and the base of the fluid chamber, and/or at least one compression spring may directly contact one or more intervening structure(s) (e.g., sleeve(s), washer(s), support(s), etc.) disposed between the at least one compression spring and the first piston. Due to the limited space within the fluid chamber (e.g., limited radial extent and limited longitudinal extent), a single compression spring disposed within the fluid chamber may not provide sufficient force to drive the ball to the closed position in response to interruption in operation of the actuator assembly (e.g., during certain operating conditions, such as high fluid pressure within the fluid passage on the first side of the ball, and/or while a conduit is extending through the ball 24, etc.). Because the valve assembly includes multiple compression springs within the fluid chamber in the illustrated embodiment, the compression springs may provide sufficient force to drive the ball to the closed position in response to interruption in operation of the actuator assembly under a wider range of operating conditions. In addition, the longevity of the multiple compression springs may be greater than the longevity of a single spring due to the reduced fatigue on the multiple compression springs.

In the illustrated embodiment, the first compression spring 64 includes a single coil spring, and the second compression spring 66 includes a single coil spring. However, in other embodiments, at least one of the compression springs may include one or more other and/or additional suitable biasing devices, such as leaf spring(s), deformable plate(s), piece(s) of resilient material (e.g., solid, including cavities, etc.), hydraulic spring(s), pneumatic spring(s), or electromagnetic spring(s), among other suitable types of device(s). In addition, at least one compression spring may include multiple biasing devices (e.g., of the same type and/or of different types). As used herein, "coil spring" refers to any suitable type of coil compression spring (e.g., having a constant diameter or a variable diameter along the axial extent of the coil spring, having a constant pitch or a variable pitch of the coils, etc.). Furthermore, in the illustrated embodiment, the multiple compression springs include two compression springs. However, in other embodiments, the multiple compression springs may include additional compression springs. For example, the multiple compression springs may include 2, 3, 4, 5, 6, 7, 8, or more compression springs. In addition, in the illustrated embodiment, the multiple compression springs are arranged concentrically about a longitudinal axis 68 of the valve assembly. However, in other embodiments, the compression springs may be arranged in any other suitable configuration. For example, the compression springs may be arranged in a radial pattern around the longitudinal axis. Furthermore, while the compression springs are disposed within the fluid chamber in the illustrated embodiment, in other embodiments, at least one compression spring may be disposed in another suitable location within the valve assembly.

Figure 5:
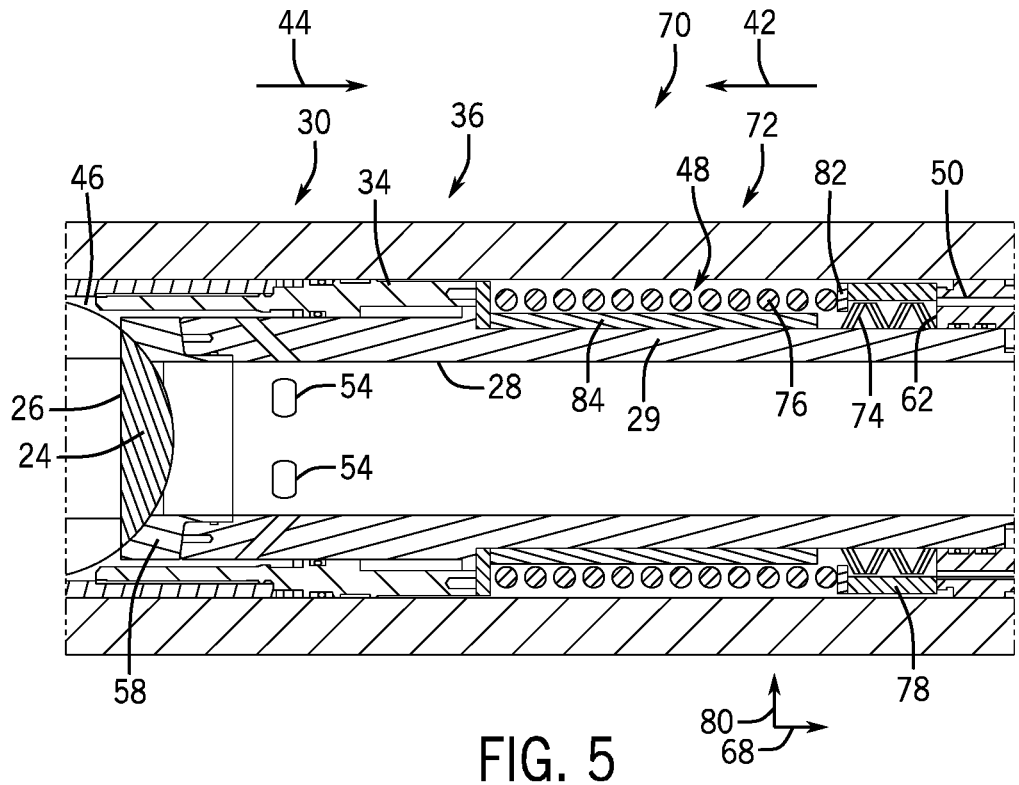
FIG. 5 is a cross-sectional view of a portion of another embodiment of a valve assembly, in which a ball of the valve assembly is in a closed position.

FIG. 5 is a cross-sectional view of a portion of another embodiment of a valve assembly 70, in which the ball is in a closed position. Similar to the valve assembly disclosed above with reference to FIGS. 1-4, the illustrated valve assembly 70 includes an actuator assembly 30 configured to drive the ball 24 between the open position and the closed position. In addition, the valve assembly 70 includes multiple compression springs 72 disposed on one side of the ball 24, in which each compression spring of the multiple compression springs 72 is configured to directly urge the ball 24 toward the illustrated closed position. The compression springs 72 provide sufficient force to the actuator assembly 30 to cause the ball to transition to the closed position in response to an interruption in operation of the actuator assembly 30. Accordingly, the illustrated valve assembly 70 is considered a failsafe closed valve assembly. Furthermore, any of the features, functions, and variations disclosed above with regard to the valve element (e.g., ball, flapper, etc.), actuator assembly, and other components of the valve assembly of FIGS. 1-4 may apply to the illustrated valve assembly.

In the illustrated embodiment, the multiple compression springs 72 include a first compression spring 74 having a first stiffness and a first expansion distance, and the multiple compression springs 72 include a second compression spring 76 having a second stiffness and a second expansion distance. The first stiffness is greater than the second stiffness, and the second expansion distance is greater than the first expansion distance. As used herein, "expansion distance" refers to the difference in length (e.g., longitudinal extent) of the compression spring between the fully compressed state and the full uncompressed state. In the illustrated embodiment, the second compression spring 76 is disposed between a sleeve 78 (e.g., annual sleeve) and the first piston 34 of the actuator assembly 30. In addition, the first compression spring 74 is concentrically aligned with the sleeve 78 along the longitudinal axis 68 of the valve assembly 70. In the illustrated embodiment, the first compression spring 74 is positioned radially inward of the sleeve 78 (e.g., inward along a radial axis 80). However, as discussed in detail below, the first compression spring may be positioned radially outward of the sleeve (e.g., outward along the radial axis 80). In the illustrated embodiment, the sleeve 78 includes a lip 82 configured to provide a base for the second compression spring 76, thereby enabling the second compression spring to have a width (e.g., radial extent) greater than the radial gap between the first compression spring and the outer body of the valve assembly. However, in other embodiments (e.g., in embodiments in which the radial extent of the second compression spring is less than the radial gap between the first compression spring and the outer body of the valve assembly), the lip may be omitted. Furthermore, in certain embodiments, the sleeve may be omitted, and the second compression spring may contact the base 62 of the fluid chamber 48. In addition, one or more components may be disposed between the first compression spring and the base of the fluid chamber, one or more other/additional components may be disposed between the second compression spring and the base of the fluid chamber, one or more components may be disposed between the first compression spring and the first piston, one or more components may be disposed between the second compression spring and the first piston, or a combination thereof.

In the illustrated embodiment, the first compression spring 74 includes multiple deformable metal rings. Each deformable metal ring may have a conical shape while uncompressed and flatten as the deformable metal ring compresses. Each deformable metal ring may apply a significant force while compressed, and the expansion distance may be small. In the illustrated embodiment, the first compression spring includes four deformable metal rings. However, in other embodiments, the first compression spring may include more or fewer deformable metal rings (e.g., 1, 2, 3, 4, 5, 6, or more). Furthermore, while the first compression spring includes at least one deformable metal ring in the illustrated embodiment, in other embodiments, the first compression spring may include other and/or additional biasing device(s), such as leaf spring(s), coil spring(s), piece(s) of resilient material (e.g., solid, including cavities, etc.), hydraulic spring(s), pneumatic spring(s), or electromagnetic spring(s), among other suitable types of springs. For example, the first compression spring may have multiple biasing devices of the same type and/or of different types.

In the illustrated embodiment, the second compression spring 76 includes a single coil spring. However, in other embodiments, the second compression spring may include one or more other and/or additional suitable biasing devices, such as leaf spring(s), deformable plate(s), piece(s) of resilient material (e.g., solid, including cavities, etc.), hydraulic spring(s), pneumatic spring(s), or electromagnetic spring(s), among other suitable types of springs. In addition, the second compression spring may include multiple biasing devices (e.g., of the same type and/or of different types). Furthermore, in the illustrated embodiment, the multiple compression springs include two compression springs. However, in other embodiments, the multiple compression springs may include additional compression springs. For example, the multiple compression springs may include 2, 3, 4, 5, 6, 7, 8, or more compression springs. In addition, in the illustrated embodiment, each compression spring extends circumferentially about the longitudinal axis 68 of the valve assembly. However, in other embodiments, the compression springs may be arranged in any other suitable configuration. For example, at least a portion of the compression springs may be arranged in a radial pattern around the longitudinal axis. Furthermore, while the compression springs are disposed within the fluid chamber in the illustrated embodiment, in other embodiments, at least one compression spring may be disposed in another suitable location within the valve assembly.

Figure 6:
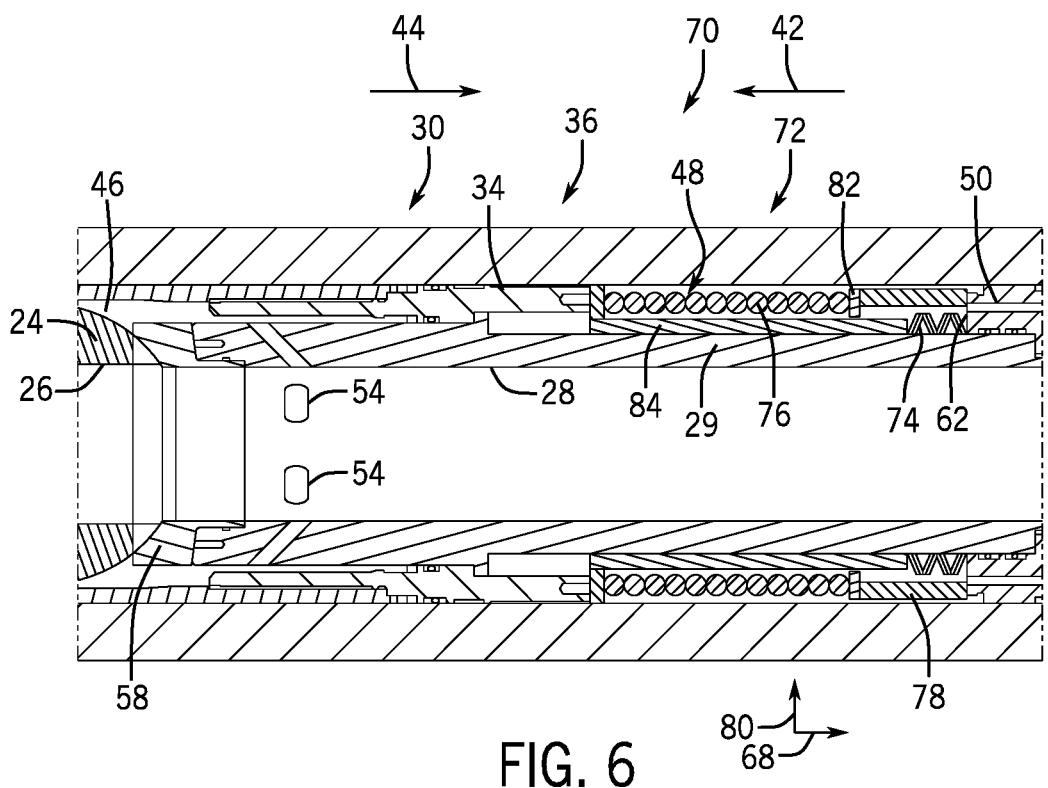
FIG. 6 is a cross-sectional view of a portion of the valve assembly of FIG. 5, in which the ball is in an open position.

FIG. 6 is a cross-sectional view of a portion of the valve assembly 70 of FIG. 5, in which the ball is in an open position. While the ball 24 is in the open position, each compression spring of the multiple compression springs 72 directly urges the actuator assembly 30 to drive the ball 24 to the closed position. As illustrated, the second compression spring 76 is compressed between the sleeve 78 and the first piston 34. Accordingly, the second compression spring 76 directly urges the first piston 34 to move in the first direction 42 (e.g., uphole direction), thereby urging the actuator assembly to drive the ball to the closed position. In addition, the first compression spring 74 is compressed between the base 62 of the fluid chamber 48 and an extension 84 of the first piston 34. Accordingly, the first compression spring 74 directly urges the first piston 34 to move in the first direction 42 (e.g., uphole direction), thereby urging the actuator assembly to drive the ball to the closed position. A length of the extension 84 (e.g., extent of the extension 84 along the longitudinal axis 68 may be particularly selected to compress the first compression spring 74 a target amount (e.g., to a fully compressed state, etc.) while the ball 24 is in the illustrated open position. Furthermore, in certain embodiments, the extension 84 may be integrally formed with other elements of the first piston 34. However, in other embodiments, the extension may be formed separately from the other elements of the first piston and coupled to the other elements (e.g., via welding, via fastener(s), etc.) to form the complete first piston.

In certain embodiments, while the ball is in the illustrated open position, contact between the seal(s) and the ball may establish significant static fiction that blocks movement (e.g., rotation) of the ball. Accordingly, in valve assemblies that use a single spring to drive the ball to the closed position in response to interruption in operation of the actuator assembly, the single spring may not provide sufficient force to overcome the static friction. In the illustrated embodiment, the first compression spring, which has a higher stiffness and smaller expansion distance, may provide sufficient force (e.g., in combination with the force provided by the second compression spring) to overcome the static friction between the seal(s) and the ball, thereby inducing the ball to rotate. The second compression spring, which has a lower stiffness and a larger expansion distance, may then drive the ball to the closed position (e.g., by overcoming the dynamic friction, which may be significantly less than the static friction). Accordingly, the multiple compression springs may provide sufficient force to drive the ball to the closed position in response to interruption in operation of the actuator assembly. Furthermore, due to the short axial extent (e.g., extent along the longitudinal axis 68) of the uncompressed first compression spring 74, a significant portion of the axial extent (e.g., extent along the longitudinal axis 68) of the fluid chamber 48 is available for the second compression spring, thereby enabling a second compression spring that provides a significant force (e.g., greater than the force provided by a shorter spring) to be disposed within the fluid chamber.

Figure 7:
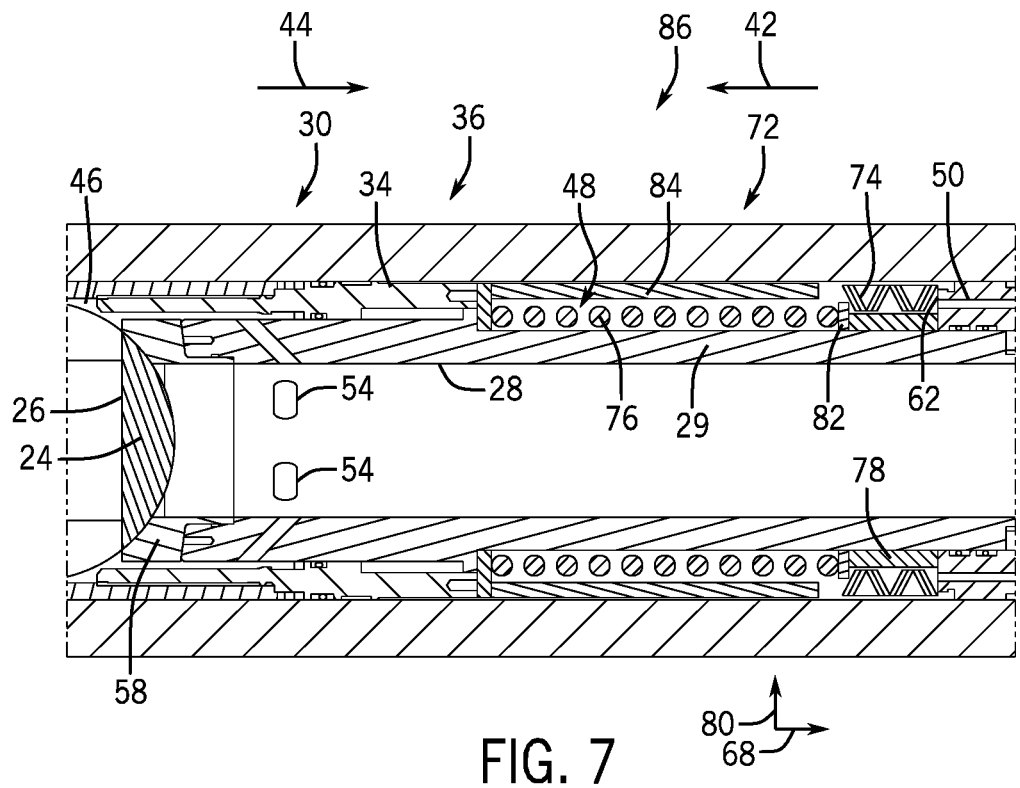
FIG. 7 is a cross-sectional view of a portion of a further embodiment of a valve assembly, in which a ball of the valve assembly is in a closed position.

FIG. 7 is a cross-sectional view of a portion of a further embodiment of a valve assembly 86, in which the ball is in a closed position. Similar to the valve assembly disclosed above with reference to FIGS. 1-4, the illustrated valve assembly 86 includes an actuator assembly 30 configured to drive the ball 24 between the open position and the closed position. In addition, the valve assembly 86 includes multiple compression springs 72 disposed on one side of the ball 24, in which each compression spring of the multiple compression springs is configured to directly urge the ball 24 toward the illustrated closed position. The compression springs 72 provide sufficient force to the actuator assembly 30 to cause the ball to transition to the closed position in response to an interruption in operation of the actuator assembly 30. Accordingly, the illustrated valve assembly 86 is considered a failsafe closed valve assembly. Furthermore, any of the features, functions, and variations disclosed above with regard to the valve element (e.g., ball, flapper, etc.), actuator assembly, and other components of the valve assembly of FIGS. 1-4 may apply to the illustrated valve assembly.

In the illustrated embodiment, the multiple compression springs 72 include the first compression spring 74 having the first stiffness and the first expansion distance, and the multiple compression springs 72 include the second compression spring 76 having the second stiffness and the second expansion distance. As previously discussed, the first stiffness is greater than the second stiffness, and the second expansion distance is greater than the first expansion distance. In the illustrated embodiment, the second compression spring 76 is disposed between the sleeve 78 (e.g., annular sleeve) and the first piston 34 of the actuator assembly 30. In addition, the first compression spring 74 is concentrically aligned with the sleeve 78 along the longitudinal axis 68 of the valve assembly 86. In the illustrated embodiment, the first compression spring 74 is positioned radially outward of the sleeve 78 (e.g., outward along the radial axis 80). However, as previously discussed, the first compression spring may be positioned radially inward of the sleeve (e.g., inward along the radial axis 80). In the illustrated embodiment, the sleeve 78 includes a lip 82 configured to provide a base for the second compression spring 76, thereby enabling the second compression spring to have a width (e.g., radial extent) greater than the radial gap between the first compression spring and the outer body of the valve assembly. However, in other embodiments (e.g., in embodiments in which the radial extent of the second compression spring is less than the radial gap between the first compression spring and the outer body of the valve assembly), the lip may be omitted. Furthermore, in certain embodiments, the sleeve may be omitted, and the second compression spring may contact the base 62 of the fluid chamber 48. In addition, one or more components may be disposed between the first compression spring and the base of the fluid chamber, one or more other/additional components may be disposed between the second compression spring and the base of the fluid chamber, one or more components may be disposed between the first compression spring and the first piston, one or more components may be disposed between the second compression spring and the first piston, or a combination thereof.

In the illustrated embodiment, the first compression spring 74 includes multiple deformable metal rings. Each deformable metal ring may have a conical shape while uncompressed and flatten as the deformable metal ring compresses. Each deformable metal ring may apply a significant force while compressed, and the expansion distance may be small. In the illustrated embodiment, the first compression spring includes four deformable metal rings. However, in other embodiments, the first compression spring may include more or fewer deformable metal rings (e.g., 1, 2, 3, 4, 5, 6, or more). Furthermore, while the first compression spring includes at least one deformable metal ring in the illustrated embodiment, in other embodiments, the first compression spring may include other and/or additional biasing device(s), such as leaf spring(s), coil spring(s), piece(s) of resilient material (e.g., solid, including cavities, etc.), hydraulic spring(s), pneumatic spring(s), or electromagnetic spring(s), among other suitable types of springs.

In the illustrated embodiment, the second compression spring 76 includes a single coil spring. However, in other embodiments, the second compression spring may include one or more other and/or additional suitable biasing devices, such as leaf spring(s), deformable plate(s), piece(s) of resilient material (e.g., solid, including cavities, etc.), hydraulic spring(s), pneumatic spring(s), or electromagnetic spring(s), among other suitable types of springs. In addition, the second compression spring may include multiple biasing devices (e.g., of the same type and/or of different types). Furthermore, in the illustrated embodiment, the multiple compression springs include two compression springs. However, in other embodiments, the multiple compression springs may include additional compression springs. For example, the multiple compression springs may include 2, 3, 4, 5, 6, 7, 8, or more compression springs. In addition, in the illustrated embodiment, each compression spring extends circumferentially about the longitudinal axis 68 of the valve assembly. However, in other embodiments, the compression springs may be arranged in any other suitable configuration. For example, at least a portion of the compression springs may be arranged in a radial pattern around the longitudinal axis. Furthermore, while the compression springs are disposed within the fluid chamber in the illustrated embodiment, in other embodiments, at least one coil spring may be disposed in another suitable location within the valve assembly.

Figure 8:
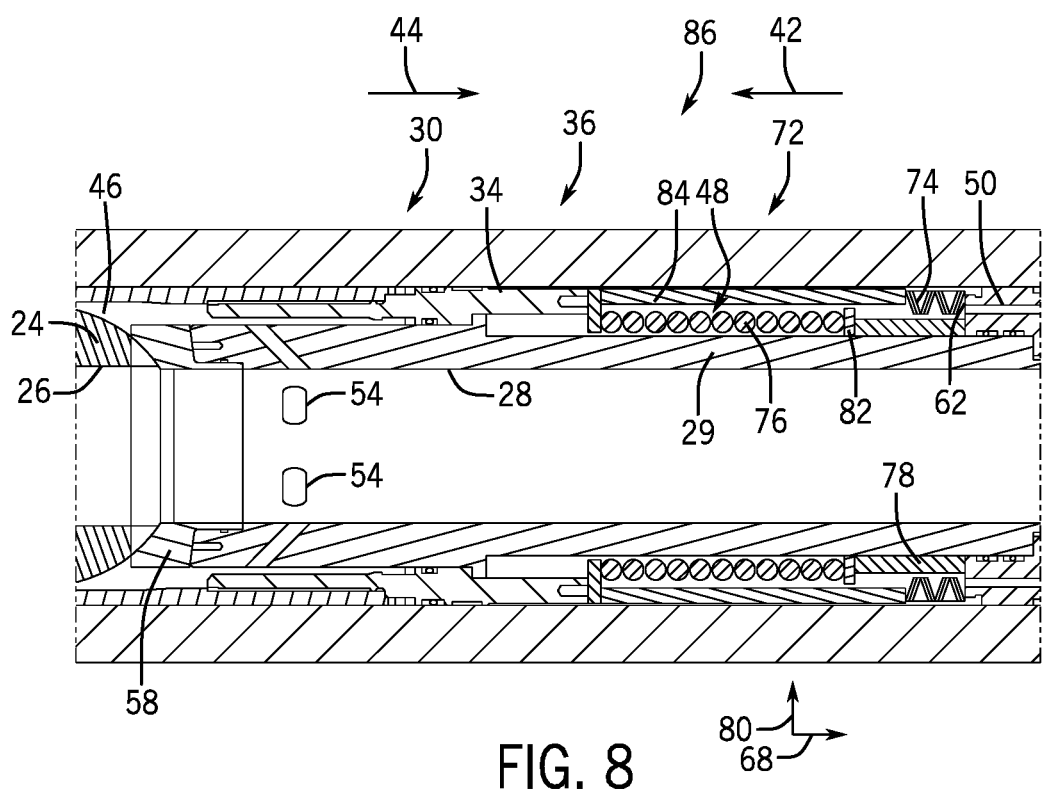
FIG. 8 is a cross-sectional view of a portion of the valve assembly of FIG. 7, in which the ball is in an open position.

FIG. 8 is a cross-sectional view of a portion of the valve assembly 86 of FIG. 7, in which the ball is in an open position. While the ball 24 is in the open position, each compression spring of the multiple compression springs 72 directly urges the actuator assembly 30 to drive the ball 24 to the closed position. As illustrated, the second compression spring 76 is compressed between the sleeve 78 and the first piston 34. Accordingly, the second compression spring 76 directly urges the first piston 34 to move in the first direction 42 (e.g., uphole direction), thereby urging the actuator assembly to drive the ball to the closed position. In addition, the first compression spring 74 is compressed between the base 62 of the fluid chamber 48 and an extension 84 of the first piston 34. Accordingly, the first compression spring 74 directly urges the first piston 34 to move in the first direction 42 (e.g., uphole direction), thereby urging the actuator assembly to drive the ball to the closed position. Furthermore, in certain embodiments, the extension 84 may be integrally formed with other elements of the first piston 34. However, in other embodiments, the extension may be formed separately from the other elements of the first piston and coupled to the other elements (e.g., via welding, via fastener(s), etc.) to form the complete first piston.

In certain embodiments, while the ball is in the illustrated open position, contact between the seal(s) and the ball may establish significant static fiction that blocks movement (e.g., rotation) of the ball. Accordingly, in valve assemblies that use a single spring to drive the ball to the closed position in response to interruption in operation of the actuator assembly, the single spring may not provide sufficient force to overcome the static friction. In the illustrated embodiment, the first compression spring, which has a higher stiffness and smaller expansion distance, may provide sufficient force (e.g., in combination with the force provided by the second compression spring) to overcome the static friction between the seal(s) and the ball, thereby inducing the ball to rotate. The second compression spring, which has a lower stiffness and a larger expansion distance, may then drive the ball to the closed position (e.g., by overcoming the dynamic friction, which may be significantly less than the static friction). Accordingly, the multiple compression springs may provide sufficient force to drive the ball to the closed position in response to interruption in operation of the actuator assembly. Furthermore, due to the short axial extent (e.g., extent along the longitudinal axis 68) of the uncompressed first compression spring 74, a significant portion of the axial extent (e.g., extent along the longitudinal axis 68) of the fluid chamber 48 is available for the second compression spring, thereby enabling a second compression spring that provides a significant force (e.g., greater than the force provided by a shorter spring) to be disposed within the fluid chamber.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A valve assembly, comprising:
a ball configured to block fluid flow through the valve assembly while the ball is in a closed position and to enable fluid flow through the valve assembly while the ball is in an open position;
an actuator assembly configured to drive the ball to transition between the open position and the closed position; and
a plurality of compression springs disposed on one side of the ball, wherein each compression spring of the plurality of compression springs is configured to directly urge the ball toward the closed position;
wherein the plurality of compression springs comprises:
a first compression spring having a first stiffness and a first expansion distance, and comprising at least one deformable metal ring; and
a second compression spring having a second stiffness and a second expansion distance;
wherein the first stiffness is greater than the second stiffness, and the second expansion distance is greater than the first expansion distance.

2. The valve assembly of claim 1, wherein the plurality of compression springs is arranged about a longitudinal axis of the valve assembly.

3. The valve assembly of claim 1, wherein the second compression spring comprises a coil spring.

4. The valve assembly of claim 1, wherein the second compression spring is disposed between a sleeve and the actuator assembly.

5. The valve assembly of claim 4, wherein the first compression spring is concentrically aligned with the sleeve along a longitudinal axis of the valve assembly.

6. The valve assembly of claim 5, wherein the first compression spring is positioned radially inward of the sleeve.

7. A valve assembly, comprising:
a ball configured to block fluid flow through the valve assembly while the ball is in a closed position and to enable fluid flow through the valve assembly while the ball is in an open position;
an actuator assembly comprising a first piston and a second piston, wherein the first piston is configured to drive the ball to transition to the closed position, and the second piston is configured to drive the ball to transition to the open position; and
a plurality of compression springs disposed on one side of the ball, wherein each compression spring of the plurality of compression springs is configured to directly urge the first piston to drive the ball to transition to the closed position;
wherein the plurality of compression springs comprises:
a first compression spring having a first stiffness and a first expansion distance; and
a second compression spring having a second stiffness and a second expansion distance;
wherein the first compression spring is disposed longitudinally adjacent the second compression spring along a longitudinal axis of the valve assembly;
wherein the first stiffness is greater than the second stiffness, and the second expansion distance is greater than the first expansion distance.

8. The valve assembly of claim 7, wherein the plurality of compression springs is arranged about the longitudinal axis of the valve assembly.

9. The valve assembly of claim 7, wherein one of the first compression spring and the second compression spring comprises a coil spring.

10. The valve assembly of claim 7, wherein the first compression spring comprises at least one deformable metal ring, the second compression spring comprises a coil spring, or a combination thereof.

11. A valve assembly, comprising:
a ball configured to block fluid flow through the valve assembly while the ball is in a closed position and to enable fluid flow through the valve assembly while the ball is in an open position;
an actuator assembly comprising a first piston positioned on a first side of the ball and a second piston positioned on a second side of the ball, opposite the first side, wherein the first piston is configured to move in a first direction to drive the ball toward the closed position, and the second piston is configured to move in a second direction, opposite the first direction, to drive the ball toward the open position;

a fluid chamber extending between the first piston and a base, wherein the fluid chamber is configured to receive pressurized fluid to drive the first piston to move in the first direction; and a plurality of compression springs disposed within the fluid chamber, wherein each compression spring of the plurality of compression springs is configured to directly urge the first piston to move in the first direction to drive the ball toward the closed position;

wherein the plurality of compression springs comprises:
a first compression spring having a first stiffness; and
a second compression spring having a second stiffness;

wherein a sleeve is disposed between the second compression spring and the base and the first compression spring is concentrically aligned with the sleeve along a longitudinal axis of the valve assembly.

12. The valve assembly of claim 11, wherein the plurality of compression springs is arranged about the longitudinal axis of the valve assembly.

13. The valve assembly of claim 11, wherein one of the first compression spring and the second compression spring comprises a coil spring.

14. The valve assembly of claim 11, wherein
the first compression spring has a first expansion distance; and
the second compression spring has a second expansion distance;
wherein the first stiffness is greater than the second stiffness, and the second expansion distance is greater than the first expansion distance.

* * * * *